No. 752,672. PATENTED FEB. 23, 1904.
J. C. HAMMER.
ANIMAL TRAP.
APPLICATION FILED NOV. 11, 1903.
NO MODEL.
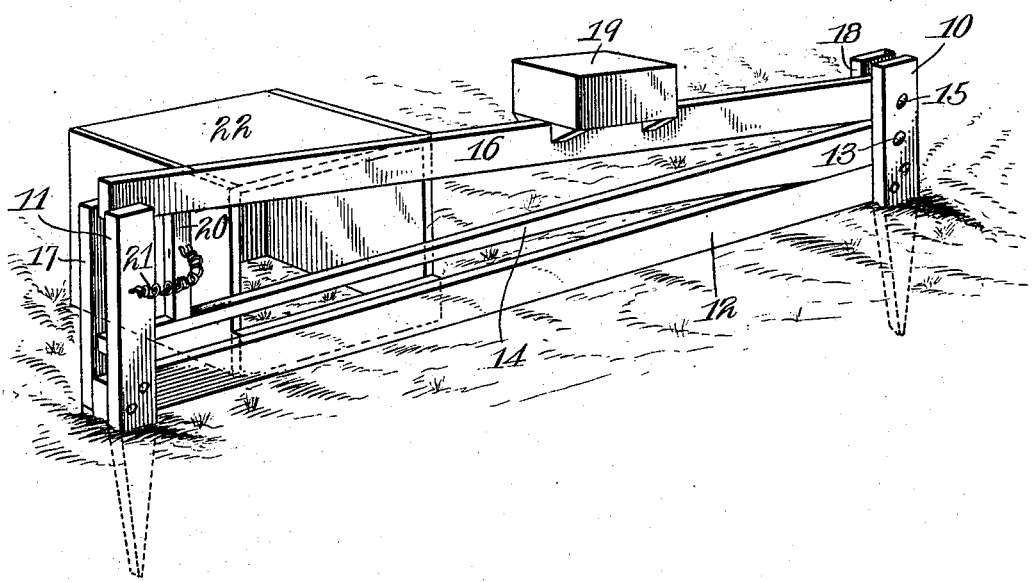
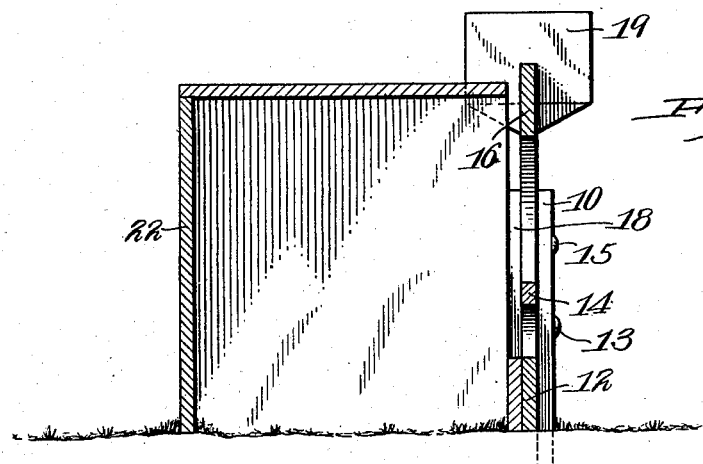
John C. Hammer, Inventor.
Witnesses No. 752,672.                                        Patented February 23, 1904.

UNITED STATES PATENT OFFICE.

JOHN C. HAMMER, OF ROSEHILL, ILLINOIS.

ANIMAL-TRAP.

SPECIFICATION forming part of Letters Patent No. 752,672, dated February 23, 1904.

Application filed November 11, 1903. Serial No. 180,740. (No model.)

*To all whom it may concern:*

Be it known that I, JOHN C. HAMMER, a citizen of the United States, residing at Rosehill, in the county of Jasper and State of Illinois, have invented a new and useful Animal-Trap, of which the following is a specification.

This invention relates to animal-traps of that class in which a poised weight is employed to crush the animals in their efforts to reach the bait, and has for its object to simplify and improve traps of this class.

The invention consists in certain novel features of construction, as hereinafter shown and described, and specified in the claims.

In the drawings illustrative of the invention, in which corresponding parts are denoted by like designating characters, Figure 1 is a perspective view of the trap "set" for the animal. Fig. 2 is a transverse sectional elevation enlarged.

The improved trap comprises two spaced supports 10 11, preferably in the form of posts, for driving into the ground or to be otherwise supported in upright position and connected by a base member 12. The posts and base member may be of any desired size and length and may be varied in size for different sizes of traps or for traps employed for catching different sizes or species of animals.

Pivotally connected, as at 13, with the post 10 is a spring-arm 14, extending in alinement with the base member 12, and pivotally connected by one end, as at 15, to the post 10 is a bar 16, swinging freely at its other end against the post 11 and in vertical alinement with the members 12 14, as shown.

The posts 10 and 11 are provided, respectively, with laterally-spaced guard-plates 17 18, serving to strengthen and support the parts and prevent lateral movement thereof, and the bar 16 will be weighted, as at 19, in any suitable manner to effect the destruction of the animal caught in the trap.

A loose block 20 is provided to be inserted between the free ends of the bar 16 and arm 14, as shown, and this block may be provided with a spring 21, adapted to forcibly withdraw the block from between the bar and arm when released.

Disposed in the rear of the panel formed by the base member 12, the arm 14, and bar 16 is a bait-box 22, open only on the side next the panel and accessible only through the space between the arm 14 and bar 16. The box 22 is preferably attached rigidly to the base member 12 or to the ground to prevent its being moved by the animal. When thus arranged and the block 20 placed between the free ends of the members 14 and 16, with the bait placed in the box 22, any attempt of the animal to reach the bait will force the parts 14 and 16 apart and release the block 20, which will permit the weighted bar 16 to fall upon the animal and crush it. The spring 21 performs an important function in this connection by instantly drawing the block from between the bar and arm on the slightest depression of the latter.

Having thus described the invention, what I claim is—

1. A trap comprising a spring-arm, a weighted bar movable toward said spring-arm, a block loosely disposed between said arm and bar, and the bait disposed on one side of said bar and arm and accessible only through the space between the bar and arm.

2. A trap comprising a spring-arm, a weighted bar movable toward said spring-arm, a block loosely disposed between said arm and bar and provided with a spring for withdrawing it from between said bars when released and the bait disposed on one side of said bar and arm and accessible only through the space between the bar and arm.

3. A trap comprising a vertical support, a weighted bar movably connected by one end to said support, a spring-arm secured rigidly at one end to said support and extending contiguous to said weighted bar, a block loosely interposed between the free ends of said weighted bar and spring-arm, and the bait for the animals disposed in the rear of said bar and arm and accessible only through the space between them.

4. A trap comprising spaced supports connected by a base member, a weighted bar movably connected by one end to one of said supports and swinging freely over the other support, a spring-arm connected rigidly to the support carrying said weighted bar and extending contiguous thereto, a block interposed loosely between the free ends of said bar and arm, and the bait disposed in the rear of said bar and arm and accessible only through the space between them.

5. A trap comprising spaced supports connected by a base member, a weighted bar movably connected by one end to one of said supports and swinging freely over the other support, a spring-arm connected rigidly to the support carrying said weighted bar and extending contiguous thereto, a block interposed loosely between the free ends of said bar and arm, a bait-box open at one side and connected at said open side to said base member and accessible only through the space between said weighted bar and spring-arm.

In testimony that I claim the foregoing as my own I have hereto affixed my signature in the presence of two witnesses.

JOHN C. HAMMER.

Witnesses:
W. D. CUMMINS,
W. O. CUMMINS.